(12) United States Patent
Delgosha et al.

(10) Patent No.: US 8,019,079 B2
(45) Date of Patent: Sep. 13, 2011

(54) ASYMMETRIC CRYPTOSYSTEM EMPLOYING PARAUNITARY MATRICES

(75) Inventors: Farshid Delgosha, Glen Cove, NY (US); Faramarz Fekri, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1077 days.

(21) Appl. No.: 11/825,756

(22) Filed: Jul. 8, 2007

(65) Prior Publication Data

US 2009/0010428 A1      Jan. 8, 2009

(51) Int. Cl.
*H04L 9/00* (2006.01)
(52) U.S. Cl. .......................................................... 380/30
(58) Field of Classification Search .................. None
See application file for complete search history.

(56) References Cited

U.S. PATENT DOCUMENTS

| | | | | |
|---|---|---|---|---|
| 5,606,609 A | * | 2/1997 | Houser et al. | 713/179 |
| 6,119,228 A | * | 9/2000 | Angelo et al. | 713/180 |
| 6,131,162 A | * | 10/2000 | Yoshiura et al. | 713/176 |
| 6,321,334 B1 | * | 11/2001 | Jerger et al. | 726/1 |

OTHER PUBLICATIONS

Schneier "Applied Cryptography: Ptotcols, Algorithms, and Source Code in C." 2nd ed. Mew York, Wiley. 1996.
H. Fell et al., "Analysis of a public key approach based on polynomial substitution," Adv. Cryptol.—CRYPTO'85, 1986, vol. 218, pp. 340-349.
T. Matsumoto et al, "Public quadratic polynomial-tuples for efficient signature-verification and message-encryption," Adv. Cryptol.—EUROCRYPT'88, Berlin, Germany, 1988.
C. Wolf, et al. In "taxonomy of public key schemes based on the problem of multivariate quadratic equations," Crypto. EPrint Archive, 2005, [Online].
F. Delgosha, et al., "Public-Key Cryptography Using Paraunitary Matrices," IEEE Transactions on Signal Processing, vol. 54, No. 9, Sep. 2006.
F. Delgosha, et al., "Multivariate Signature Using Algebraic Techniques," ISIT 2006, Seattle, USA, Jul. 9-14, 2006.
Daemen, et al., "The Design of rijndael" AES—The Advanced Encryption Standard. Berlin, Germany: Springer-Verlag, 2002.
A. Shamir, et al., "Efficient signature schemes based on birational permutations," Adv. Crypto.—CRYPTO'93, 1994, vol. 773, pp. 1-12.
D. Coppersmith, et al., "Attacks on he birational permutation signature schemes," Adv. Crypto.—CRYPTO'93, 1994, vol. 773, pp. 435-443.

(Continued)

Primary Examiner — Nasser Moazzami
Assistant Examiner — Ghazal Shehni
(74) Attorney, Agent, or Firm — Alicia L. W. Brewster, Esq.; Ryan A. Schneider, Esq.; Troutman Sanders LLP

(57) ABSTRACT

Disclosed are multivariate paraunitary asymmetric cryptographic systems and methods based on paraunitary matrices. The cryptographic systems and methods are based on formulating a system of multivariate polynomial equations by paraunitary matrices. These matrices are a family of invertible polynomial matrices that can be completely parameterized and efficiently generated by primitive building blocks. Using a general formulation involving paraunitary matrices, a one-way function is designed that operates over the fields of characteristic two. Approximations made to a paraunitary matrix result in a trapdoor one-way function that is efficient to evaluate, but hard to invert without secret information about the trapdoor. An exemplary implementation operates on the finite field GF(256). In this example, the message block includes 16 to 32 symbols from GF(256), i.e., the block size is an integer between 16 and 32. The ciphertext block takes its elements from the same field and has at least 10 extra symbols.

3 Claims, 3 Drawing Sheets

OTHER PUBLICATIONS

S. Goldwasser, et al., "Probabilistic encryption," J. Comput. System. Sci., vol. 28, No. 2, pp. 270-299, 1984.

M. Blum, et al., in "An efficient probabilistic public key encryption scheme which hides all partial information," Adv. Cryptol.—CRYPTO'84, 1984, vol. 196, pp. 289-302.

M. Bellare et al., "random oracles are practical: A paradigm for designing efficient protocols," Proc. ACM Conf. Comput. Commun. Security—CCS'93, New York, 1993, pp. 62-73.

J. C. Faugere et al., in "Algebraic cryptalanalysis of hidden field equation (HFE) cryptosystems using Gröbner bases," in Adv. Cryptol.—CRYPTOL'03, vol. 2729, pp. 44-60.

A. Kipnis et al., in "Cryptanalysis of the HFE public key cryptosystem by relinearization," in Adv. Cryptol.—CRYPTO'99, 1999, vol. 1666, pp. 19-30.

N. T. Courtois, et al., "Efficient algorithms for solving overdefined systems of multivariate polynomial equations," Adv. Cryptol.—EUROCRYPT'00, 2000, vol. 1807, pp. 392-407.

* cited by examiner

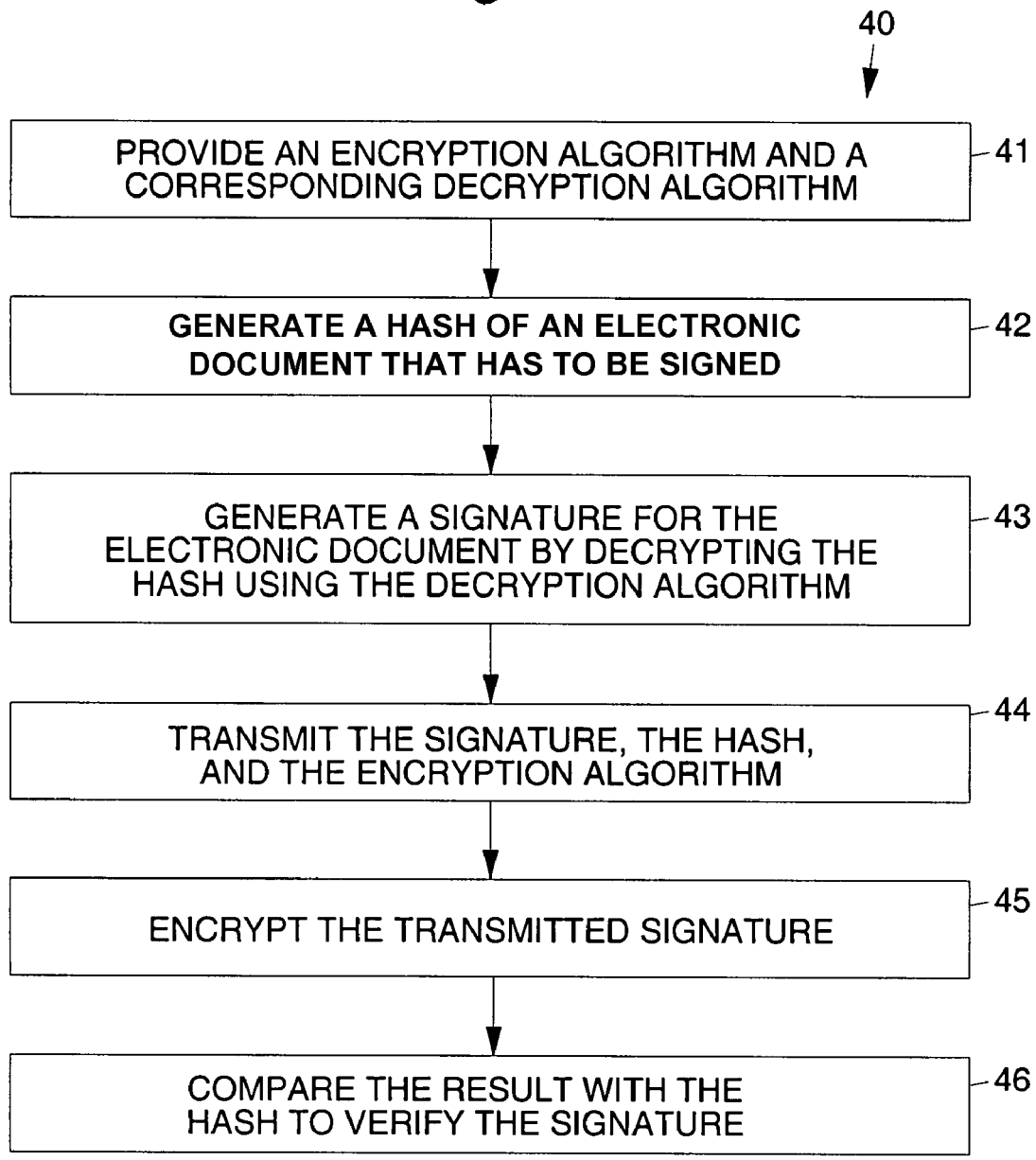

ASYMMETRIC CRYPTOSYSTEM EMPLOYING PARAUNITARY MATRICES

BACKGROUND

The present invention relates generally to cryptographic primitives and more particularly, to public-key (asymmetric) cryptographic systems and digital signature algorithms that are based on paraunitary matrices.

The principal of public-key cryptography involves exchanging information between parties without requiring a secure channel. Public-key cryptography is different from secret-key cryptosystems in which both parties must share a secret key. In a public-key system, each party has a pair of secret and public keys. Everyone can send encrypted message to a designated party using its public key. However, only the designated party can decrypt using his corresponding secret key. Public-key systems are used for the exchange or the distribution of secret keys that are used in symmetric cryptosystems. Except for the key exchange, other applications of public-key cryptography are digital signature and data authentication schemes. A well-known public-key cryptosystem, RSA, uses a univariate monomial over a very large ring. The public key consists of the exponent of a monomial and a composite number obtained by multiplying two large prime numbers. The security of RSA is believed to be based on the problem of factoring large composite numbers. Although after its conception in 1978, RSA has not been broken yet, there are some practical problems in its implementation. The first problem is the key-setup time that is too long for computationally-limited processors used in some applications such as pervasive computing. For example, it takes tens of minutes on a Palm V that uses a 16.6 MHz Dragonball processor to generate 1024 bits RSA key. Another problem is the size of the key that is too long in applications where bandwidth is limited. It must also be increased every year because of improvements in the factorization algorithms and computational power. Currently, the minimum recommended size of RSA key is 1024 bits. As suggested by Schneier in *Applied Cryptography: Protocols, Algorithms, and Source Code in C.*" $2^{nd}$ ed. New York, Wiley. 1996, the minimum size must be 4096 bits by 2015 and 8192 bits by 2025. This implies more complicated computations and longer key-setup time in the future.

In an attempt to remedy these problems, two paths are taken: 1) using monomials as the public key and hiding information in the exponent that leads to the discrete logarithm over complicated groups (e.g., points on elliptic curves) and 2) considering multivariate polynomials over small fields (e.g., $GF(2^m)$ for some small m). Comparing to RSA, systems based on the discrete logarithm over elliptic curves are able to maintain the same security level with shorter key sizes. Hence, elliptic curve cryptography (ECC) seems to be suitable for devices with low computational power such as smart cards. However, ECC also has some problems and drawbacks. The shortest signature that one can generate using an elliptic curve digital signature algorithm (ECDSA) is 320 bits, which is still long for many applications. Elliptic curves over fields of characteristic two can be easily implemented in hardware, but in order to maintain security, one must employ a very large finite field, which implies a long signature. The Koblitz curves are special elliptic curves used to reduce the complexity of ECC. However, some cryptographers are concerned that the special structure in these curves (to facilitate an efficient implementation) may actually be used to efficiently attack them. Another problem is the complexity of the elliptic curve signature-verification algorithm. A comparison between ECDSA and RSA in a field with prime characteristic shows that for practical sizes of fields and moduli, signature verification with ECDSA is 40 times slower than that using RSA.

Considering the shortcomings of the RSA and ECDSA, it would be desirable to have practical cryptosystems based on problems other than the assumptions currently in use. One might be in a safer state against possibilities such as the emergence of an efficient algorithm for factoring or computing discrete logarithms. An alternative approach is multivariate cryptography that includes systems based on multivariate polynomials over small fields. Multivariate cryptography is considered to be the cryptography of the $21^{st}$ century. Cryptosystems based on multivariate polynomials over small fields are faster than RSA and ECC. These are schemes whose public information is a set of multivariate polynomials. Their security is based on the difficulty of solving systems of multivariate polynomial equations. The main challenge in designing such systems is including a trapdoor in the public polynomials without using polynomials with very specific forms. However, systems of random polynomials are usually very hard to invert as this difficulty is the security basis of multivariate cryptosystems. To solve this paradigm, schemes have been proposed whose public polynomials are attempted to look random while the special structure is somehow hidden from the view of cryptanalyst. For example, hidden field equations (HFE) scheme uses a quadratic univariate monomial over an extension field of a small finite field. The representation of the monomial over the small field gives a set of quadratic homogenous polynomials. Unfortunately, this scheme and many of its variants have been broken because of the special form of the public polynomials. There are some other designs, which are reviewed below, that are all broken.

Previous Work in Multivariate Cryptography

The outline of a public-key cryptosystem based on iterative polynomial substitution is discussed by H. Fell et al., in "Analysis of a public key approach based on polynomial substitution," *Adv. Cryptol.—CRYPTO '85*, 1986, vol. 218, Lecture Notes in Computer Science, pp. 340-349. The idea is attractive and simple, but as the authors mention, the number of terms in polynomials astronomically increase even after a few iterations. A few solutions are provided to limit the number of terms, but some solutions are not very practical and none of them gives an efficient cryptosystem.

The idea of using homogenous quadratic polynomials as the public information is discussed by T. Matsumoto et al., in "Public quadratic polynomial-tuples for efficient signature-verification and message-encryption," *Adv. Cryptol.—EUROCRYPT '88*, Berlin, Germany, 1988. To generate the public polynomials, an invertible quadratic monomial over $GF(q^n)$, a degree n extension field of $GF(q)$, is chosen. Here, q is a power of 2. The field $GF(q)$ can be considered as an n-dimensional vector space over $GF(q)$. Using basis vectors, the quadratic monomial is converted to n quadratic homogenous polynomials in n variables. The encryption is performed by evaluating public polynomials at the plaintext block. For decryption, the ciphertext block is transformed back to $GF(q^n)$ and the monomial is inverted. Unfortunately, this scheme has been broken because of some unexpected algebraic relations.

Two generalizations of this scheme, called hidden field equations (HFE) and isomorphisms of polynomials (IP) were developed. The HFE scheme has been broken. The attack uses the simple fact that every quadratic homogenous multivariate polynomial has a matrix representation. Using this representation, a highly overdefined system of quadratic homogenous equations in the secret information is obtained. A new technique called relinearization for solving such systems was proposed by Kipnis. Running numerous experiments showed that this technique for solving overdefined systems of homogenous quadratic polynomials is not as efficient as one may expect. Hence, it was improved as XL and FXL algorithms. These algorithms are efficient only when the number of polynomial equations is proportional to the square of the number of unknown variables.

Other attacks on the HFE scheme have been developed. These attacks take advantage of the special format of the public polynomials. The latest attack on the HFE family is the fast algorithm of Faugere for computing Gröbner basis. It has been shown that the system of public polynomials of HFE can be solved in a reasonable time using this algorithm.

The signature scheme QUARTZ is based on a variant of HFE. QUARTZ can generate signatures of length 128 bits with the security level $2^{80}$. The security of QUARTZ is studied by Courtois and some generic attacks are provided. The signature schemes FLASH and SFLASH are based on the C*—algorithm that can be regarded as a special case of the more general HFE scheme. It was claimed that these schemes can generate signatures of lengths 296 and 259 bits with the security level $2^{80}$, respectively. However, SFLASH has been broken.

A signature scheme based on birational permutations is based on using a quadratic homogenous tame automorphism and hiding its coefficients by applying two affine transforms one at the input and one at the output. The public key in this scheme consists of a number of multivariate quadratic polynomials over the ring $Z_n$ where n=pq is a positive composite integer consisting of two distinct large prime factors p and q. Although the security of this scheme is based on the integer-factorization problem, it can be regarded as a multivariate cryptographic scheme because of its structure. This scheme has been broken by Coppersmith.

A public-key cryptosystem and signature scheme based on the composition of four tame automorphisms, called tame transformation method (TTM), was introduced by Moh. This scheme was broken by Goubin where the cryptanalysis is reduced to an instance of the MinRank problem that can be solved in feasible time.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 is a flow diagram that illustrates the signature generation and verification of an exemplary digital signature method.

DETAILED DESCRIPTION

Figure 1:
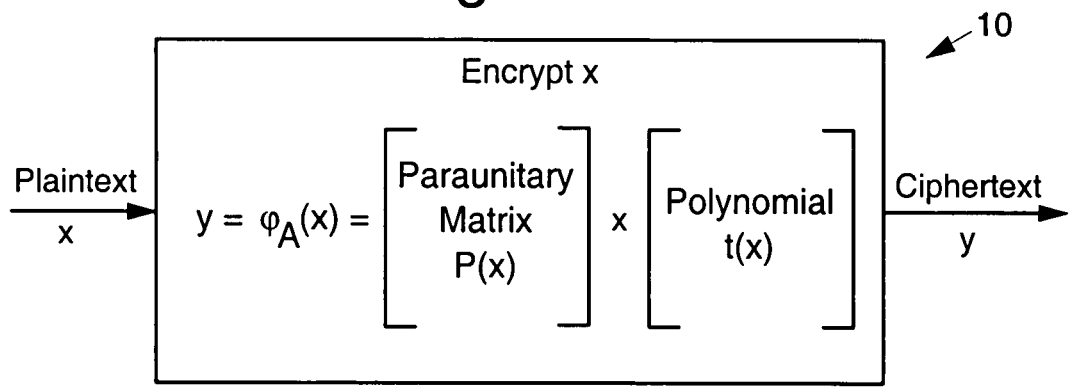
FIG. 1 illustrates construction of an exemplary paraunitary asymmetric cryptographic system.

Referring to the drawing figures, disclosed are public-key asymmetric cryptographic systems and methods and digital signature systems and methods that employ paraunitary matrices. Two papers by the present inventors are incorporated herein in their entirety by references. These are "Public-Key Cryptography Using Paraunitary Matrices," IEEE Transactions on Signal Processing, Vol, 54, No. 9, September 2006, and "Multivariate Signature Using Algebraic Techniques," ISIT 2006, Seattle, USA, Jul. 9-14, 2006.

Public-Key Cryptography

Public-key cryptography is usually used to exchange secret keys between two parties who have had no prior acquaintance. The secret key is used for encrypting information using secret-key cryptosystems. The reason public-key cryptosystems are not used to encrypt all information is that they are usually much more computationally complex whereas secret-key cryptosystems are much faster.

FIG. 1 illustrates an exemplary paraunitary asymmetric cryptographic system 10. In the system 10, a document or information, referred to as plaintext (x), is encrypted to produce the ciphertext (y). Encryption is performed using a paraunitary matrix and a bijection polynomial vector.

Paraunitary matrices are used for the very first time to design public-key cryptosystems. The paraunitary asymmetric cryptosystem (PAC), at the core, comprises of a paraunitary (PU) matrix over a Galois field specifically GF(256). To define a paraunitary matrix, consider a polynomial matrix P(x), i.e., a matrix of the form $$P(x) = \begin{bmatrix} p_{11}(x) & \cdots & p_{1n}(x) \\ \vdots & \ddots & \vdots \\ p_{n1}(x) & \cdots & p_{nn}(x) \end{bmatrix}$$

in which x is a short form for representing n variables $(x_1, \ldots, x_n)$ and $p_{ij}(x)$'s are all polynomials in n variables. Such a matrix is paraunitary if and only if $$P^T(x_1^{-1}, \ldots, x_n^{-1})P(x_1, \ldots, x_n)=I,$$

where the superscript T denotes the matrix transposition and I is the identity matrix.

In the following, a very simplified description of the PAC is provided (with some mathematical details trimmed off). To specify the PAC for his own use, an identity A takes the following steps.

(1) Deigns a paraunitary matrix P(x) in n variables (2) Designs a polynomial vector (a vector with its entries being polynomials) t(x) such that it is a bijection, i.e., knowing $(y_1, K, y_n)$=t$(x_1, K, x_n)$, one uniquely determines the values of $x_1, \ldots, x_n$.

(3) Carries out the following multiplication (masking)

$$\psi_A(x) = \begin{bmatrix} \psi_1(x) \\ \vdots \\ \psi_n(x) \end{bmatrix} = \begin{bmatrix} p_{11}(x) & \cdots & p_{1n}(x) \\ \vdots & \ddots & \vdots \\ p_{n1}(x) & \cdots & p_{nn}(x) \end{bmatrix} \begin{bmatrix} t_1(x) \\ \vdots \\ t_n(x) \end{bmatrix}$$

(4) Makes the polynomial vector $\psi_A(x)$ public and keeps the paraunitary matrix P(x) secret.

Everyone can encrypt information and send to A. To encrypt a message x (also referred to as the plaintext), one simply evaluates the polynomials $\psi_1(x)$, K, $\psi_n(x)$ at x. Let y=Enc$_A$(x) denote the encryption algorithm provided by A.

As is illustrated in FIG. 1, Plaintext x→Enc y=$\psi_A$(x)→ciphertext y.

The decryption process requires knowledge of the secret information that consist of the PU matrix P and the polynomial vector t. Hence, it cannot be performed by everybody, except A. Let SA denote the secret information of A. The decryption algorithm is represented by x=Dec$_{SA}$(y).

Key exchange between two parties through public-key cryptography, in its simplest form, is as follows. Consider two parties A and B. One of them, say A, randomly picks a secret key k. Moreover, A obtains the authentic encryption algorithm of B from a trusted third party. A sends y=$Enc_B$(k) to B. Upon receiving y, B retrieves the secret key through k=$Dec_{SB}$(y).

Figure 2:
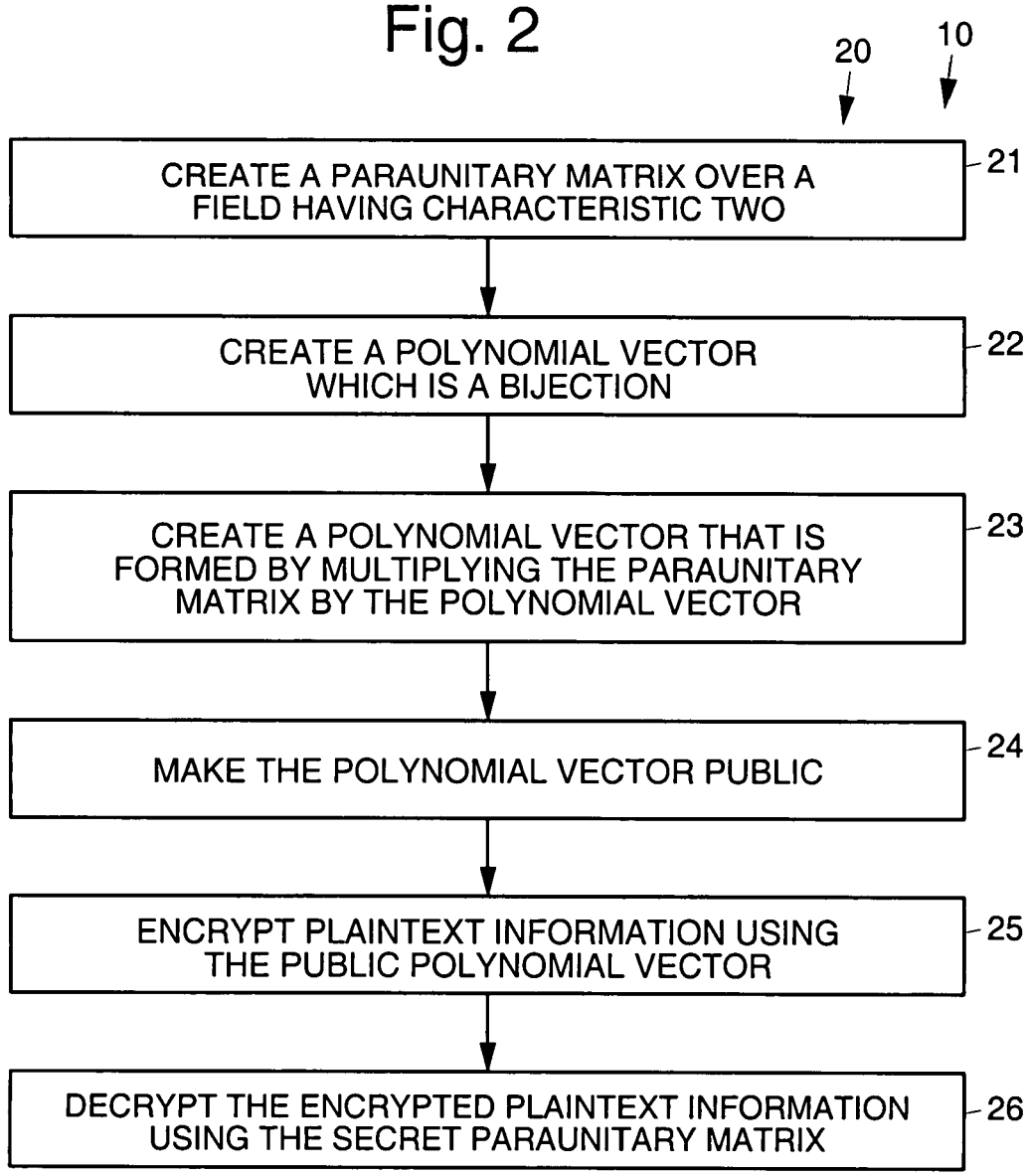
FIG. 2 is a flow diagram that illustrates encryption and decryption operations in an exemplary paraunitary asymmetric cryptographic method.

FIG. 2 is a flow diagram that illustrates operations in an exemplary paraunitary asymmetric cryptographic method 20. FIG. 2 also illustrates components of the system 10. The exemplary system 10 and method 20 may be implemented as follows.

Apparatus is provided for creating 21 a paraunitary matrix over a field of characteristic two. Apparatus is provided for creating 22 a polynomial vector whose entries are polynomials and which is a bijection. Apparatus is provided for creating 23 a polynomial vector that is formed by multiplying the paraunitary matrix by the polynomial vector. Apparatus is provided for making 24 the polynomial vector public. Apparatus is provided for encrypting 25 the plaintext information using the public polynomial vector. Apparatus is provided for decrypting 26 the encrypted plaintext information using the secret paraunitary matrix.

The exemplary public-key cryptographic method may be implemented as follows. A paraunitary matrix over a field having characteristic two is defined. A plaintext vector x is generated. The plaintext vector x is masked by evaluating a bijective vector at x and multiplying the result by the paraunitary matrix evaluated at x.

Digital Signature Algorithms

One of the applications of public-key cryptography is the design of digital signature schemes. Since the length of the signature is desirable to be independent of the document length, a short digest of the document to be signed is generated using a hash function. A hash function or message digest code (MDC) generates a short constant-length digest of its input. To simplify explanations, it is assumed that x is the hash of the document to be signed and y is the signature.

The main idea in the design of a signature scheme is as follows. Consider an identity A with the encryption algorithm $Enc_A(\bullet)$ and the decryption algorithm $Dec_{SA}(\bullet)$. To sign x, A uses his decryption algorithm to generate the signature y as follows.

$$y=Dec_{SA}(x).$$

Then, A provides y as the signature and $Enc_A(\bullet)$ as the verification algorithm (public information). Note that x is also available to public. The verification of a signature y' is performed as follows.

Verified if x=$Enc_A$(y')

Unverified if x≠$Enc_A$(y')

By this description, only A can generate an authentic signature while everyone else can verify the generated signature.

Figure 3:
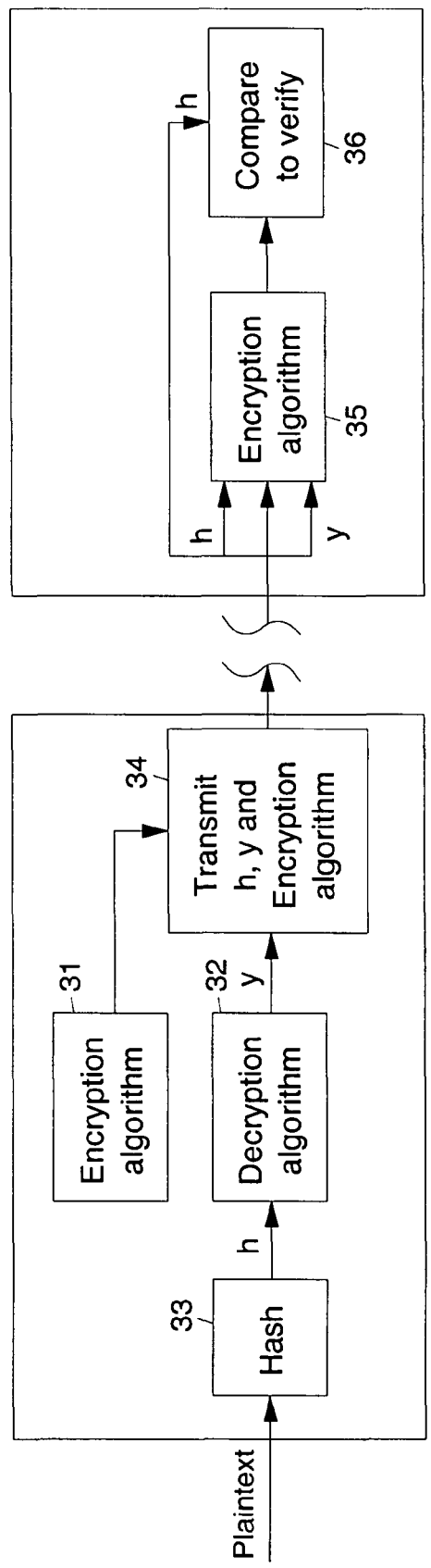
FIG. 3 illustrates construction of an exemplary digital signature system.

Referring to FIG. 3, it illustrates an exemplary digital signature system 30. The exemplary system 30 comprises an encryption algorithm 31 and the corresponding decryption algorithm 32. Apparatus 33 is provided for generating a hash of an electronic document that is to be signed. Apparatus 34 (including the decryption algorithm 32) is provided for generating a signature (y) for the electronic document by decrypting the hash using the decryption algorithm. Apparatus 34 is provided for transmitting the signature, the hash, and the encryption algorithm. Apparatus 35, 36 are provided for encrypting 35 the transmitted signature and comparing 36 the result with the hash to verify the signature.

FIG. 4 is a flow diagram that illustrates an exemplary digital signature method 40. The method 40 may be implemented as follows. At a first site, an encryption algorithm and the corresponding decryption algorithm are provided 41. A hash of an electronic document that is to be signed is generated 42. A signature for the electronic document is generated 43 at the first site by decrypting the hash using the decryption algorithm. The signature, the hash, and the encryption algorithm are transmitted 44 to a second site. The transmitted signature is encrypted 45 at the second site and the result is compared 46 with the hash to verify the signature.

The Cryptographic System

Disclosed is a novel approach for deigning practical public-key cryptosystems. In this approach, paraunitary (PU) matrices are employed to design a one-way function (OWF). The entries of a PU matrix are polynomials with coefficients from a finite field. By their definition, all such matrices are invertible, and obtaining their inverses requires no computation. To include a trapdoor in the OWF, some simplifications in the PU matrix employed in the design of the OWF are made. The difficulty of inverting the designed OWF is connected to the difficulty of solving systems of multivariate polynomial equations over finite fields. To establish this connection, it is shown that any system of multivariate polynomials is expressible in terms of PU matrices. This relationship along with some mathematical conjectures provide enough evidence for the computational security of the trapdoor OWF.

A paraunitary asymmetric cryptosystem (PAC) is provided that is based on the developed trapdoor OWF. The public key in the paraunitary asymmetric cryptosystem consists of a number of multivariate polynomials with coefficients from a finite field F. For practical reasons, the Galois field GF(256) may be used as the field F although it can be any Galois field. To encrypt a message block, which is a vector x∈$F^n$ for some fixed positive integer n, the public polynomials are evaluated at x. Since there are efficient algorithms for polynomial evaluation, the encryption algorithm in the disclosed scheme is very efficient. The cipher text is a vector y∈$F^{n+r}$, where r is a fixed positive integer. The decryption algorithm involves matrix multiplication and polynomial evaluation that can be efficiently performed. Hence, the decryption is also very efficient in the PAC. The typical choices of n and r are 32 and 10, respectively.

PU matrices are a subclass of invertible matrix polynomials whose inverses are guaranteed to exist by their definition. Because of their useful properties, PU matrices have found many applications in signal processing, filter banks, wavelets, and error-control coding. In fact, in earlier works, PU matrices are shown to be promising building blocks to construct wavelet-based symmetric ciphers. It has been shown that every univariate PU matrix over a field of characteristic two can be constructed by multiplying a small number of parameterized PU building blocks. Since there are algorithms to efficiently generate the univariate building blocks, the key-setup time in the PAC is shorter than that in RSA and ECC. Considering the efficiency of the key setup, the encryption, and the decryption in the PAC, its main application is in constrained environments where the computational power is limited.

There exist a limited number of fully-parameterized building blocks, which are PU matrices themselves, that may be used to generate multivariate PU matrices. To generate an arbitrary PU matrix, one simply multiplies these building blocks in an arbitrary order. In the PAC, the parameters of these building blocks are determined based on the secret key.

In the system, the secret key provided by the user is a vector k∈$F^n$. A key-expansion algorithm is employed to expand the secret key into a finite set of vectors of the same length n. These vectors are employed as the design parameters for the parautary building blocks required to construct the PU matrix. In addition, they serve as the design parameters for other matrices and vectors involved in the design of the PAC.

To study the computational security of the PAC, it is argued that its public polynomials are indistinguishable from an arbitrary set of multivariate polynomials. For this purpose, a connection is established between an arbitrary system of multivariate polynomials and PU matrices. It is shown that the problem of expressing every set of multivariate polynomials in the form of the public polynomials in the PAC is equivalent to the PU completion problem that has strong ties with the Quillen-Suslin theorem. The PU completion problem is a well-known mathematical conjecture that is proved to be true in many cases. However, the validity of its general form is an open problem. Although this does not provide a solid proof for the security of the scheme, it is noted that no public-key cryptosystem including RSA and ECC have ever been proved to be secure. As a matter of fact, the existence of OWFs has not been formally proved.

Disclosed is a practical instance of the PAC by providing specifications for the general description of the system. By comparing the complexities of the key setup, the encryption, and the decryption in the PAC and the HFE, it is shown that the former has comparable level of complexity. A complete cryptanalysis of the PAC is discussed which shows that none of the attacks applicable to the HFE presents a security threat to the PAC.

The notation used herein is discussed below. Previous designs by algebraic techniques are briefly reviewed. Unitary and paraunitary matrices are reviewed. The relationship between general systems of multivariate polynomial equations and PU matrices is established. In addition, the public-key generation, encryption, and decryption algorithms of PAC are described. The computational security of the disclosed scheme is discussed in a mathematical language. A practical instance of the general design is introduced and cryptanalyzed.

Notation

Boldfaced lowercase letters are used for vectors. Matrices are denoted by boldfaced uppercase letters. The symbol N is used for the set of natural numbers, and $[n]=\{x \in N: 1 \leq x \leq n\}$. The set of all integers is denoted by Z. The Galois field $GF(2^m)$, for $m \in N$, is denoted by F since m is fixed. The set of all permutations on n elements is denoted by $S_n$. If $x=(x_1, \ldots, x_n)$ and $\alpha=(\alpha_1, \ldots, \alpha_n)$, then the shorthand notation $x^\alpha$ is used to denote $x_1^{\alpha_1}, K, x_n^{\alpha_n}$. Assuming R is a field or a ring, the vector space or the module of column vectors of length n with entries from R is denoted by $R^n$. The ring of n×k matrices with entries from R is represented by $M_{n,k}(R)$. In the case n=k, the notation $M_n(R)$ is used. The terms vector polynomial and matrix polynomial are used for polynomials whose coefficients are vectors or matrices, respectively. These terms are interchangeably used with the polynomial vector and polynomial matrix that refer to vectors and matrices whose entries are polynomials. One can easily show that these terminologies address the same concept, but from different viewpoints.

In order to facilitate future references, frequently used notations are listed below with their meanings.

[n] $\{x \in N: 1 \leq x \leq n\}$;
F Galois field of characteristic two;
$S_n$ set of all permutations on n elements;
x $(x_1, \ldots, x_n)$;
α $(\alpha_1, \ldots, \alpha_n)$;
$x^\alpha$ $x_1^{\alpha_1}, \ldots, x_n^{\alpha_n}$;
$M_{n,k}(R)$ ring of n×k matrices with entries from the ring R;
$F[x^{\pm 1}]$ ring of Laurent polynomials $F[x_1^{-1}, \ldots, x_n^{-1}]$;

$\tilde{P}(x_1, \ldots, x_n)$ para-Hermitian conjugate $P^T(x_1^{-1}, \ldots, x_n^{-1})$ of the polynomial matrix P;
$U_n(F)$ set of all n×n unitary matrices over the finite field F;
$U_{v,\xi}$ unitary building block defined by equation (1);
$PU_n(R)$ set of all n×n paraunitary matrices over the ring R;
$B_1(x; v)$ degree-one paraunitary building block defined by equation (3);
$B_2(x; u, v)$ degree-two paraunitary building block defined by equation (4).

Unitary and Paraunitary Matrices

A matrix $A \in M_n(F)$ is called unitary if $A^T A = I$. The set of all n×n unitary matrices over the field F is denoted by $U_n(F)$. As an example, consider the matrix $$U_{v,\xi} = I + \xi v v^T,$$

where $\xi \in F$ and $v \in F^n$ such that v is self orthogonal, i.e., $v^T v = 0$. Since F is a finite field, nonzero self-orthogonal vectors exist in $F^n$. It is easily verified that $U_{v,\xi}^T U_{v,\xi} = I$. In fact, it was proved by Fekri et al. in "Theory of Paraunitary Filter Banks over Fields of Characteristic Two," in *IEEE Trans. Inform. Theory*, vol. 48, No. 11, November 2002, pp. 2964-2979 that $U_{v,\xi}$ is the generating building block for all unitary matrices.

The natural generalization of unitary matrices is paraunitary matrices whose entries are polynomials. Before discussing paraunitary matrices, define the sesquilinear form $\langle, \rangle: R^n \times R^n \rightarrow R^n$ as follows. For $f=[f_1, \ldots, f_n]^T \in R^n$ and $g=[g_1, \ldots, g_n]^T \in R^n$, define $$\langle f, g \rangle = \tilde{f} g = \sum_{i=1}^{n} f_i g_i.$$

A set of vectors $\{f_1, \ldots, f_n\}$ is called orthonormal if $\langle f_i, f_j \rangle = \delta_{ij}$ for all $i,j \in [N]$, where $\delta_{ij}$ is the Kronecker delta. Based on this definition, the set of column vectors of a paraunitary matrix in $PU_n(R)$ is an orthonormal basis for the module $R^n$.

A matrix polynomial $P(x) \in M_n(R)$ is called paraunitary if and only if $\tilde{P} P = \tilde{P}(x) P(x) = I$ or in other words, $$P^T(x_1^{-1}, \ldots, x_n^{-1}) P(x_1, \ldots, x_n) = I \quad (2)$$

for all $x_1, \ldots, x_n \in F \setminus \{0\}$. The set of all n×n paraunitary matrices over the ring R is denoted by $PU_n(R)$.

A PU matrix over $F[x^{-1}]$ can be interpreted as the transfer function of a linear time-invariant system. In that context, the degree of a paraunitary matrix in every variable is the minimum number of delay elements in the corresponding variable with which the system can be implemented. There are building blocks for univariate PU matrices over $F[x]$. It was proved by Fekri et al. in "Theory of Paraunitary Filter Banks over Fields of Characteristic Two," in *IEEE Trans. Inform. Theory*, vol. 48, No. 11, November 2002, pp. 2964-2979 that the elementary building blocks are:

(1) degree-one paraunitary building block $$B_1(x; v) = I + v v^T + v v^T x \quad (3)$$

where $v \in F^n$ is a design parameter such that, $v^T v = 1$;

(2) degree-two paraunitary building block $$B_2(x; u, v) = I + u v^T + v u^T + (u v^T + v u^T) x \quad (4)$$

where $u, v \in F^n$ are design parameters such that $u^T u = v^T v = 0$ and $u^T v = 1$;

(3) degree-nτ paraunitary building block $$R_{n\tau}(x; \Lambda, V) = V \Lambda V^T + I x^\tau + V \Lambda V^T x^{2\tau} \quad (5)$$

In equation (5), $\tau \in N$ and $V=[v_1 \ldots v_n] \in M_n(F)$, where $v_i \in F^n$ such that $v_i^T v_j = 0$ for all $i, j \in [n]$. Moreover, $\Lambda = \text{diag}(\lambda_1, \ldots,$ $\lambda_n) \in M_n(F)$ is a diagonal matrix. Note that $\tau$, V, and $\Lambda$ are the design parameters of the degree-n$\tau$ building block.

It is easily verified that the matrices defined in equations (3)-(5) are all paraunitary. Finding generating building blocks for general multivariate paraunitary matrices is an open problem. Some of these matrices may be captured by multiplying univariate building blocks in different variables. Since these building blocks do not commute, the resulting multivariate paraunitary matrix is not separable.

Below, the structure of the PAC is described and showed how PU matrices can be efficiently used to generate nonlinear equations.

Paraunitary Asymmetric Cryptosystem

The goal in multivariate cryptography is designing a one-way function (OWF) using a system of multivariate polynomial equations. Solving such systems of equations, in general, is an NP-hard problem since all the known algorithms have computational complexity exponential with respect to the number of variables. The OWF is used to design public-key cryptosystems and digital signature schemes. The main challenge is how to include a trapdoor in the OWF without using polynomials of very special form because such polynomials usually weaken the security of the OWF. Consider arbitrary multivariate polynomials $f_1(x), \ldots, f_n(x) \in F[x]$ where $x=(x_1, \ldots, x_n)$. They can be considered as the entries of a vector $f=[f_1, \ldots, f_n]^T \in R_n$, where $R=F[x^{\pm 1}]$.

As discussed above, the columns $p_1, \ldots, p_n$ of an arbitrary paraunitary matrix $P \in PU_n(R)$ form an orthonormal basis for $R^n$. Hence, there exist polynomials $t_1, \ldots, t_n \in R$ such that $$f = \sum_{i=1}^{n} t_i P_i \quad (6)$$

or $$f(x) = P(x) t(x) \quad (7)$$

where $t=[t_1, \ldots, t_n]^T$. Since this equation holds for every paraunitary matrix, there is no unique t associated with a given f.

In the above, it was shown that given a vector f and a paraunitary matrix P, one can find a vector t such that equation (7) holds. In the design of the OWF $\psi$, equation (7) is used, but instead of finding t for given f and P, a secret automorphism is chosen (i.e., bijective vector polynomial) t and a PU matrix P, then the public vector-polynomial f=Pt is obtained.

There is no general algorithm to generate all automorphisms over the vector space $F^n$. However, it is possible to generate some of them by composing tame automorphisms. An automorphism $t=[t_1, \ldots, t_n]^T$ of the form $$t_i(x) = \alpha_i x_{\sigma(i)} g_i(x_{\sigma(i)}, \ldots, x_{\sigma(i-1)}), \forall i \in [n] \quad (8)$$

is tame where $\sigma \in S_n$, $\alpha_i \in F \setminus \{0\}$, and $g_i \in F[x_{\sigma(1)}, \ldots, x_{\sigma(i-1)}]$ for all $i \in [n]$. A tame automorphism can be efficiently inverted. To compute $t^{-1}(y)$ for $y=(y_1, \ldots, y_n) \in F^n$, the following formula is recursively used.

$$x_{\sigma(i)} = \alpha_i^{-1} + g_i(y_i + g_i(x_{\sigma(i)}, \ldots, x_{\sigma(i-1)})), i \in [n]$$

To encrypt a message, the public polynomials $f_1, \ldots, f_n$ are evaluated at the message block. However, to decrypt the ciphertext block by inverting $\psi$, the value of P(x) at the message x is required. This implies the knowledge about x.

To solve this problem, an r-variate, $r \in [n]$, paraunitary matrix $P \in PU_n(F[z])$ may be used, where $z=(z_1, \ldots, z_r)$, and compose it with the vector polynomial $\phi \in (F[z])^r$. To decrypt the ciphertext, only the value of ö(x) is required.

By the definition of PU matrices in equation (2), $P(z_1, \ldots, z_r)$ is singular whenever $z_i=0$ for some $i \in [r]$. Thus, none of the entries of the vector polynomial $\phi(x)$ must have a root in $F^n$. The polynomial $\phi(x)$ is appended to the vector polynomial $$\hat{\psi}(x) = (P \circ \phi)(x) t(x) \quad (10)$$

to form the new vector polynomial $$\check{\psi}(x) = \begin{bmatrix} (P \cdot \varphi)(x) t(x) \\ \varphi(x) \end{bmatrix}. \quad (11)$$

To mix the equations, the secret affine transformation $v(\check{\psi}) = A\check{\psi} + b$ is used, where $A \in U_{n+r}(F)$ is a unitary matrix and $b \in F^{n+r}$ is an arbitrary vector. A unitary matrix is used since: 1) it can be easily and efficiently generated using the unitary building block, 2) by its construction, it is guaranteed to be invertible, and 3) its inverse can be easily obtained with no computation. In a single formula, the paraunitary trapdoor OWF $\psi$ is as follows.

$$\psi: \quad R^n \to R^{n+r} \quad (12)$$

$$x \to y = A \begin{bmatrix} (P \cdot \varphi)(x) t(x) \\ \varphi(x) \end{bmatrix} + b$$

This is an OWF since evaluating $\psi(x)$ for a given x is easy, but inverting this function seems to be hard. In fact, there does not seem to exist an algorithm to solve the equation $\psi(x)=c$, for given $c \in F^{n+r}$, more efficient than the general methods for solving systems of multivariate polynomial equations. The trapdoor information consist of the paraunitary matrix P, the unitary matrix A, the vector b, the automorphism t, and the multivariate polynomial ö. Hence, $\psi$ is a trapdoor OWF.

The composite matrix polynomial $(P \circ \phi)(x)$ in equation (12) approximates the PU matrix P(x) in equation (7). This approximation is in the sense that the entries of the PU matrix P(x) in equation (7) are taken from the ring F[x] while those of $(P \circ \phi)(x)$ in equation (7) belong to the ring $F[\phi(x)]$. These two rings are both extensions of the finite field F, and their relationship is expressed by $$F \subseteq F[\phi(x)] \subseteq F[x]. \quad (13)$$

The transcendence degree of the extension ring $F[\phi(x)]$, that is an integer between 0 and n, determines whether this ring is close to F or to F[x]. The transcendence degree of an extension ring generalizes the notion of the dimension of a vector space. Let d be the transcendence degree of $F[\phi(x)]$. If d=0, then $F[\phi(x)] \cong F$, and if d=n, $F[\phi(x)] \cong F[x]$. In general, $\phi(x)$ is a mapping from $F^n$ to $F^r$; thus, it cannot be a bijection if r<n. However, the extension ring $F[\phi(x)]$ obtains its highest transcendence degree when $\phi(x)$ is "close to a bijection". This term implies that the pre-images of elements of $F^r$ under the mapping $\phi$ are subsets of $F^n$ that all have the same number of elements. Mathematically, this means that the cardinality of the set $\phi^{-1}(z) = \{x \in F^n : \phi(x) = z\}$ is independent of the value of z.

If $\phi = [\phi_1, \ldots, \phi_r]^T$, then the following composition is suggested $$\phi_i = \gamma \circ \rho_i \forall i \in [r]. \quad (14)$$

Here, $\rho = [\rho_1, \ldots, \rho_n]^T \in (F[x])^r$ is close to a bijection. The vector polynomial $$\rho_i = \alpha_i x_{\sigma(r-i+1)} + g_i x_{\sigma(r-i+2)}, \ldots, x_{\sigma(n)}, \forall [r] \quad (15)$$

may be used where $\sigma \in S_n$, and $\alpha_i \in F \setminus \{0\}$, and $g_i = F[x_{\sigma(r-i+2)}, \ldots, x_{\sigma(n)}]$ for all $i \in [r]$. To invert $\rho$ in equation (15), the values of $x_{\sigma(r-i+2)}, \ldots, x_{\sigma(n)}$ can be arbitrarily chosen and then the values of $x_{\sigma(r-i+2)}, \ldots, x_{\sigma(r)}$ are obtained from a recursive equation similar to equation (9). Hence, $|\rho^{-1}(z)| = |F|^{n-r}$ for any $z \in F^r$ is "close" to a bijection.

As explained before, none of the entries of the vector polynomial $\phi$ must have a root in $F^n$. The irreducible polynomial $\gamma \in F[x]$ in equation (14) is used to guarantee that this does not happen. It is suggested that the polynomial $$\gamma(x) = x^2 + x + \omega, \quad \omega \in F \tag{16}$$

be used, and which is irreducible whenever $$Tr(\omega) = \sum_{k=0}^{m-1} \omega^{2^k} \neq 0$$

assuming $F = GF(2^m)$. Since $\gamma$ is not an automorphism, $\phi$ is not as close to a bijection as $\rho$ is. However, $\gamma$ is a 2-1 mapping since $\gamma(x+1) = \gamma(x)$ for every $x \in F$. Hence, the vector polynomial $\phi$ is not significantly deviated from a bijection.

Before using the key-generation algorithm, an algorithm is required to expand the master key provided by the user. Algorithm 1 is employed for this purpose.

| Algorithm 1: Key expansion |
|---|
| INPUT: The master key $k = [k_1, \ldots, k_n]^T \in F^n$ |
| OUTPUT: The parameter set $K = \{k_1, \ldots, k_\kappa\} \subset F^n$ |
| 1. for $i = 1$ to n do $k_{i1} \leftarrow k_i$ |
| 2. $k_1 = [k_{11}, \ldots, k_{n1}]^T$ |
| 3. for $j = 2$ to $\kappa$ do |
| 4. $k_{1j} \leftarrow k_{1,j-1} \oplus k_{1,j-1}^{-1} \oplus c_{j-1}$ |
| 5. for $i = 2$ to n do $k_{i,j} \leftarrow k_{i,j-1} \oplus k_{i-1,j}^{-1}$ |
| 6. $k_j = [k_{1j}, \ldots, k_{nj}]^T$ |
| 7. end |

This algorithm specifies how the vectors required in the key-generation algorithm are derived from the master key k. The vectors in the set K, the output of the key-expansion algorithm, are used to generate the elementary paraunitary building blocks, the vector polynomial $\phi$, the automorphism t, the unitary building blocks, and the vector b. The structure of the key-expansion algorithm is very similar to that of the block cipher AES discussed by Daemen, et al., in *The Design of Rijndael" AES—The Advanced Encryption Standard*. Berlin, Germany: Springer-Verlag, 2002. The design criteria, similarly, is having nonlinear relations between each output vector and the master key such that taking advantage of these relations in an attack is infeasible. In Algorithm 1, $\kappa$ is chosen such that there are enough vectors in K, the binary operation $\oplus$ is the bitwise exclusive-OR, and $c_1, \ldots, c_{\kappa-1}$ are public constants.

It is possible to replace the key-expansion algorithm with a pseudo-random number generator. For present purposes, a fast pseudo-random number generator such as the shrinking or self-shrinking generator is adequate. The shrinking generator consists of two LFSRs that one clocks the other. The idea is to generate a third source of pseudo-random bits that has better "quality" than the original sources. (Here, quality refers to the difficulty of predicting the pseudo-random sequence.) Let $a_0, a_1, \ldots$ and $s_0, s_1, \ldots$ be the outputs of the two LFSRs. The shrinking generator constructs a third sequence $z_0, z_1, \ldots$ that includes those bits $a_1$ for which the corresponding $s_i$ is "1". There are also more complicated pseudo-random number generators based on one-way functions.

Algorithm 2 is used to generate the public and secret keys used in $\psi$.

| Algorithm 2: Key generation |
|---|
| INPUT: Master key $k \in F^n$ |
| PUBLIC OUTPUT: Public polynomial vector $\Psi \in (F[X])^{n+r}$ |
| SECRET OUTPUT: P : an r-variate paraunitary matrix in $PU_n(F[z])$, |
| $\phi$ : a vector polynomial in $(F[X])^r$, t : an automorphism over |
| $F^n$, A : a unitary matrix in $U_{n+r}(F)$, b : a constant vector in $F_{n+r}$ |

1. Using Algorithm 1, expand the master key k in order to generate the set K consisting of $\kappa$ vectors each of length n. The vectors in this set are used as the design parameters in every step of this algorithm.
2. Generate an r-variate PU matrix $P \in PU_n(F[z])$ by multiplying arbitrarily chosen elementary building blocks given in equations (3)-(5). Note that each of these building blocks requires a number of parameters. Use the vectors in the expansion set K as the design parameters.
3. Choose a vector polynomial $\phi \in (F[x])^r$ that is close to be a bijection (in the sense explained before) and none of its entries, as a polynomial in F[x], has a root in $F^n$. Use the vectors in K as the design parameters.
4. Choose an automorphism t: $F^n \to F^n$ whose coefficients are obtained from K.
5. Construct the vector polynomials $\hat{\psi}$ and $\check{\psi}$ as in equations (10) and (11), respectively.
6. Generate a unitary matrix $A \in U_{n+r}(F)$ by multiplying the elementary building blocks given in equation (1) with different design parameters. In addition, choose a vector $b \in F^{n+r}$ using the vectors in K.
7. Construct the vector polynomial $\psi(x)$ as in equation (12).

Using the introduced $\psi$, the public-key PAC is implemented using Algorithms 3 and 4 below. These algorithms are used to encrypt and decrypt in the PAC.

| Algorithm 3: Encryption |
|---|
| INPUT: Plaintext block $x \in F^n$ |
| OUTPUT: Ciphertext block $y \in F^{n+r}$ |
| 1. Evaluate the public vector-polynomial $\Psi(x)$ at x. |

| Algorithm 4: Decryption |
|---|
| INPUT: Ciphertext block $y \in F^{n+r}$ |
| OUTPUT: Plaintext block $x \in F^n$ |
| 1. $\hat{v} \leftarrow A^T(y + b) \in F^{n+r}$ |
| 2. $v \leftarrow [v_1, \ldots, v_n]^T$ where $\hat{v} = [v_1, \ldots, v_n, z_1, \ldots, z_r]^T$ |
| 3. $x \leftarrow t^{-1}(P^T(z_1^{-1}, \ldots, z_r^{-1})v)$ |

The PAC operates on any finite field $GF(2^m)$ with $m \geq 2$. The reason it should not be used over GF(2) is that since none of the entries of the vector polynomial $\phi$, must take the value zero, the only possible choice is $\phi(x) \equiv 1$. With this choice, the paraunitary matrix P becomes a constant matrix independent of the values of x. Hence, the PAC becomes a constant matrix multiplied by a vector polynomial that is an automorphism. Instances of such schemes were proposed by A. Shamir, et al. in "Efficient signature schemes based on birational permutations," *Adv. Crypto.—CRYPTO '93*, 1994, vol. 773, Lecture Notes in Computer Science, pp. 1-12 and broken by D. Coppersmith, et al. in "Attacks on the birational permutation signature schemes," *Adv. Crypto.—CRYPTO '93*, 1994, vol. 773, Lecture Notes in Computer Science, pp. 435-443. GF(256) may be used to enhance the implementation of the scheme.

The length of the ciphertext in the paraunitary asymmetric cryptosystem is n+r. By increasing r, the length of the ciphertext increases, but as explained before, the general formula in equation (7) is approximated better since the transcendence degree of $F[\phi(x)]$ increases.

In the following, it is shown how to construct a probabilistic scheme using the paraunitary asymmetric cryptosystem.

Probabilistic PAC

The PAC is a deterministic scheme, i.e., the mapping from the plaintext space to the ciphertext space is deterministic. In other words, given the plaintext, the corresponding ciphertext is always the same. This determinism might cause some leakage of partial information to the adversary. For example, the RSA function preserves the Jacobi symbol of the plaintext, and with the discrete-log function, it is easy to compute the least significant bit of the plaintext from the ciphertext by a simple Legendre symbol calculation. In order to prevent the leakage of partial information, the notion of semantic security was proposed by S. Goldwasser, et al., in "Probabilistic encryption," *J. Comput. System. Sci.*, vol. 28, no. 2, pp. 270-299, 1984. Informally, a public-key cryptosystem is semantically secure if, for all probability distributions over the message space, whatever a passive adversary can compute in expected polynomial time about the given ciphertext, it can compute in expected polynomial time without the ciphertext. Semantic security is the reminiscent of Shannon's perfect secrecy in which the adversary is given unbounded computational power. Although theoretically attractive, perfect secrecy is not achievable unless the key is as long as the message. This requirement hinders the practical usefulness of perfect secrecy. By contrast, semantic security can be viewed as the polynomially-bounded version of perfect secrecy in which the adversary is given limited computational power.

In a semantically secure cryptosystem, the mapping from the plaintext to the ciphertext is probabilistic. Hence, different encryptions give different ciphertexts corresponding to a single plaintext. An efficient probabilistic public-key cryptosystem based on the RSA one-way function was discussed by M. Blum, et al. in "An efficient probabilistic public key encryption scheme which hides all partial information," *Adv. Cryptol.—CRYPTO '84*, 1984, vol. 196, Lecture Notes in Computer Science, pp. 289-302. In general, there are standard methods to construct probabilistic schemes based on deterministic one-way functions. In the following, the method proposed by M. Bellare et al. in "Random oracles are practical: A paradigm for designing efficient protocols," *Proc. ACM Conf. Comput. Commun. Security—CCS '93*, New York, 1993, pp. 62-73 to achieve semantic security is briefly explained. This method is based on the random oracle model.

Let $G: F^n \rightarrow F^{2n+r}$ be a random generator that is public to everybody and $\psi$ be an OWF such as the one in equation (12). Consider the following probabilistic encryption function.

$$E^G: F^n \rightarrow F^{2n+r}$$

$$x \rightarrow \psi(u) \| (G(u)+x) \qquad (17)$$

Here, $u \in F^n$ is a randomly chosen vector and $\|$ denotes the concatenation of two vectors. The encryption function $E^G$ is semantically secure. Note that the data expansion factor of 2n+r is unavoidable. The adversary, without the trapdoor information, is unable to calculate u and hence x although G is public.

Computational Security of the Paraunitary Asymmetric Cryptosystem

The computational security of the paraunitary asymmetric cryptosystem is evaluated by providing evidences that relate the difficulty of inverting the OWF in paraunitary asymmetric cryptosystem to a known computationally hard problem. The computational security measures the amount of computational effort required, by the best currently-known methods, to defeat a system. In general, it is very difficult to prove the security of public-key cryptosystems. For example, it is known that if the public modulus in RSA is factored into its prime factors, then RSA can be broken. However, it is not proved that breaking RSA is equivalent to factoring the public modulus. By providing some theorems and conjectures, it is established that the connection between the hardness of inverting the OWF $\psi$ in the PAC and the difficulty of solving a general system of multivariate polynomial equations.

The paraunitary asymmetric cryptosystem is based on the formula $$f(x)=P(x)t(x) \qquad (18)$$

where $f \in R^n$ is an arbitrary polynomial vector, $P \in PU_n(R)$, and $t \in R^n$ is an automorphism over $F^n$. As explained previously, given an arbitrary polynomial vector f, the relation in equation (18) is valid when the condition on t is relaxed. The security of the scheme reduces to the difficulty of solving general systems of multivariate polynomial equations if the following conjecture is proved.

Conjecture 1: Given an arbitrary polynomial vector $f \in R^n$, there always exists a matrix $P \in PU_n(R)$ and an automorphism $t \in R^n$ such that equation (18) holds.

This conjecture implies that an arbitrary system of multivariate polynomials can always be represented in the form of equation (18). Hence, if this conjecture is true, the public polynomials of PAC are indistinguishable from an arbitrary system of multivariate polynomials.

The group $PU_n(R)$ acts on the module $R^n$ by matrix multiplication. Notice that paraunitary matrices preserve the norm, i.e., if $P \in PU_n(R)$ and f, $t \in R^n$ such that f=Pt, then $f\bar{f}=t\bar{t}$. Hence, $PU_n(R)$ acts on the set $V_n^\alpha(R)=\{f \in R^n: f\bar{f}=\alpha\bar{\alpha}\}$ for every $\alpha \in R$. This group action is transitive if for every two arbitrary f, $t \in V_n^\alpha(R)$, there exists a matrix $P \in PU_n(R)$ such that f=Pt. Conjecture 1 is a weaker statement than the transitivity of the action of $PU_n(R)$ on $V_n^\alpha(R)$ because, for the purpose of the PAC, t is always an automorphism. Hence, the following conjecture, if proved, suffices to prove the Conjecture 1.

Conjecture 2: The group $PU_n(R)$ acts transitively on the set $V_n^\alpha(R)$.

This conjecture has strong ties with the PU completion problem. This problem is as follows.

Problem 1 (The PU Completion Problem)

Given the vector $t \in R^n$ such that $f\bar{f}=\alpha\bar{\alpha}$ where $\alpha \in R$, does there exist a matrix $P \in PU_n(R)$ such that f is the first column of $\alpha P$?

The following lemma gives the relationship between the Conjecture 2 and the PU completion problem.

Lemma 1: The group $PU_n(R)$ acts transitively on $V_n^\alpha(R)$ for every $\alpha \in R$, if and only if the PU completion problem has a positive answer.

Proof: ($\Rightarrow$) Let $f \in R^n$ such that $f\bar{f}=\alpha\bar{\alpha}$ and $e=[1, 0, \ldots, 0]^T \in R^n$. Since $PU_n(R)$ acts transitively on $V_n^\alpha(R)$, there exists a matrix $P \in PU_n(R)$ such that $f=P\alpha e$. The first column of $\alpha P$ is f and αP is the PU completion of f. (⇒)Let f, g∈$V_n^\alpha$(R) be arbitrary polynomial vectors and e be a vector defined as the first part of the proof.

Since every paraunitary polynomial vector has a paraunitary completion, there are paraunitary matrices P, Q∈$PU_n$(R) such that f=αPe and g=αQe. This implies f=PQg. Thus, $PU_n$(R) acts transitively on $V_n^\alpha$(R).

The paraunitary completion problem has a positive answer if the class of generalized-unitary matrices, denoted by $GU_n$(R), is considered instead of the class of paraunitary matrices.

Theorem 3 (Quillen-Suslin): Every generalized-unitary polynomial-vector f∈$R^n$ has a completion in $GU_n$(R).

The matrix P∈$M_{n,k}$(R) is called generalized unitary if there exists a matrix Q∈$M_{n,k}$(R) such that $\tilde{Q}$P=I. The set of n×n generalized unitary matrices is denoted by $GU_n$(R). Note that $PU_n$(R)⊂$GU_n$(R). The paraunitary completion problem has a positive answer for the case n=2, but for n>2, it is still an open problem. This problem also has a positive answer for arbitrary n when R=$\mathbb{C}[x^{\pm 1}]$ where $\mathbb{C}$ is the field of complex numbers.

Below, a practical instance of the PAC is provided by choosing the parameters in its general description.

A Practical Instance of the PAC

There are numerous ways to design paraunitary asymmetric cryptosystem depending on the choices of the parameters in Algorithm 2 that is used to generate the key. A good design is the one that meets the following criteria:

1. The public polynomials, entries of ψ, must look random; they should not have any special structure. Solving the system of public polynomials for the plaintext must be computationally infeasible.

2. It is desirable to have sparse public polynomials to keep down the complexity of the encryption. The number of terms of the vector polynomial φ has the most influence in the number of terms of the public polynomials. Therefore, φ should have a few terms.

3. The evaluation of the automorphism t and its inverse must be efficient.

An instance of the PAC is presented in this section by providing specifications for the general description of the system in Algorithm 2.

The resulting scheme is intended to meet the design criteria. Choose F=GF(256) because of implementation considerations. In addition, choose 16≦32 for the block length that corresponds to 128 to 256 bits. However, the scheme is flexible and the order of the field F and value of n can be different without affecting the structure. The secret key consists of n symbols from F. r is fixed because its value exponentially affects the number of monomials of the PU matrix P. Considering the range of n, it is suggested that r=10 for reasons that will become clear later in the paper. For this choice of r, the size of the ciphertext block varies between 208 and 264 bits.

A. Constructing the Vector Polynomial ψ

For the PU matrix P, only $B_1$ and $B_2$ building blocks defined in equations (3) and (4) are used because the number of their parameters is less than those of $R_{rt}$ defined in equation (5). Moreover, they can be generated with less complexity. To generate the PU matrix P∈$PU_n$(F[z]), where z=$[z_1, \ldots, z_r]^T$, N univariate building blocks are designed in each variable. The parameter N is independent of n, and its typical value is 2. Let $C_{(i-1)N+1}(z_i), \ldots, C_{iN}(z_i)$ be the PU building blocks in the variable $z_i$ for all i∈[r]. Then, the paraunitary matrix P(z) is obtained as follows $$P(z) = \prod_{i=1}^{rN} C_{\sigma(i)}(z_{\lceil \sigma(i)/N \rceil}), \quad (19)$$

where σ∈$S_{rN}$ is a public permutation and ⌈·⌉ is the ceiling function. Note that since these building blocks do not commute, the order of terms in the above multiplication is important.

The special structure of the $B_1$ and $B_2$ building blocks makes the multiplication of the $C_i$ matrices less complex than multiplying arbitrary matrices. By induction, it can be easily shown that these building blocks and their multiplications have the following form $$C(z) = I + \sum_{\bar{a} \in A} \sum_{j \in J} u_{\bar{a}j} v_{\bar{a}j}^T z^{\bar{a}} \quad (20)$$

where $u_{\alpha j}$, $v_{\alpha a}$∈$F^n$, A⊂$\mathbb{Z}_{\geq 0}^r$ and J⊂N such that A and J are finite sets. Note that the matrix C is completely determined if the sets A and J along with the following sets of vectors are known.

$$U(C)=\{u_{\alpha j}:\alpha \in A, j \in J\} \quad (21a)$$

$$V(C)=\{v_{\alpha j}:\alpha \in A, j \in J\} \quad (21b)$$

Hence, if C is one of the intermediate matrices in the process of multiplying the matrices $C_i$ in equation (19), instead of multiplying the vectors $u_{\alpha j}$ and $v_{\alpha j}$, the sets U(C) and V(C) are obtained. That is why the generating algorithms for the building blocks $B_1$ and $B_2$, as described below, only compute the vector parameters of these building blocks. The advantage of this strategy is reducing the complexity of multiplying matrices. The following fact can be stated about the complexity of multiplying two matrices of this special form.

Fact 1: Let $C_1, \ldots, C_L$ be matrices each with the form of the special format of equation (20). Then, the complexities of computing U($\prod_{i=1}^L C_i$) and V($\prod_{i=1}^L C_i$) are both upper bounded by $$\left| \bigcup \left( \prod_{i=1}^L C_i \right) \right| (Ln + L - 2) \leq \left( \prod_{i=1}^L \left| \bigcup (C_i) \right| \right) [L(n+1)-2] = O(n)$$

assuming that L and the cardinalities of all sets are independent of n.

Using this procedure, after carrying out all the multiplications required to compute the PU matrix P in equation (19), the sets U(P) and V(P) are obtained. Having these sets, by Fact 1, the following fact can be stated about the total complexity of generating the matrix P.

Fact 2: The complexities of constructing U(P) and V(P) are both upper bounded by $2^{2rN}$[rN(n+1)−2]=O(n) since r and N are constants. Having U(P) and V(P), the complexity of constructing P(z) is at most $|U(P)|n^2 \leq 2^{2rN}n^2=O(n^2)$. Hence, the total complexity of constructing P(z) is at most $2^{2rN}[n^2+rN(n+1)-2]=O(n^2)$.

Every entry of P is a multivariate polynomial in $z_1, \ldots, z_r$ with the maximum degree of $z_i$ being N for all i∈[r]. Hence, the following fact can be stated.

Fact 3: Entries of the PU matrix P are r-variate polynomials whose monomials are subsets of a maximal set of monomials. The cardinality of this maximal set is $O((N+1)^r)=O(1)$ since both N and r are constants.

With r=10 and N=2, the size of the maximal set in Fact 3 is $3^{10} \approx 2^{16}$. It is feasible to generate and store a polynomial with this many monomials in practice.

For $\phi$, a structure is used as suggested in equation (14) for the irreducible polynomial $\gamma$ as in equation (16) (in which the value of $\omega$ is public) and the vector polynomial $\rho$ as follows.

$$\rho_i(x) = \alpha_i x_{r-i+1} + \beta_i \prod_{j=r-i+2}^{n} x_j^{a_{ij}} \quad \forall i \in [r] \quad (22)$$

Here, $a_{ij} \in N$ are public exponents and $\alpha_i, \beta_i \in F \setminus \{0\}$, for all $i \in [r]$, are secret coefficients whose values are obtained from the set K in Algorithm 2. The exponents $a_{ij}$ directly influence the degree of the final public polynomials. As will be explained later, to make sure that some attacks are not applicable on the system, these exponents are chosen proportional to the block length n, i.e., $$a_{ij} = O(n) \forall i,j. \quad (23)$$

As the result, the total degree of the public polynomials becomes proportional to n. Note that since all the computations are performed in $GF(2^m)$, all exponents are modulo $2^{m-1}$. Hence, if $2 \leq n$, equation (23) will not have the desired effect. The following fact gives the complexity of constructing $\phi$.

Fact 4: The complexity of constructing $\phi$ as in equation (14) is $O(r)=O(1)$ since r is constant.

The next step is composing P(z) and $\phi(x)$ to get the matrix polynomial $(P \circ \phi)(x)$. Let $P(z)=[p_{ij}(z)]$, where $$p_{ij}(z) = \sum_{\tilde{a} \in C} p_{ij\tilde{a}} z^{\tilde{a}} \in F[z]$$

and $c \subset \mathbb{Z}_{\geq 0}^r$, $C \subset Z_{\geq 0}^r$ is a finite set such that $|C|=O(1)$ by Fact 3. To construct $$P(\varphi(x)) = \left[\sum_{\alpha \in C} p_{ij\alpha} \varphi^\alpha(x)\right],$$

$\phi^\alpha(x)$ for $\alpha \in C$ must be computed.

Since the exponents $\alpha \in C$ are independent of n, the complexity of computing $(p_{ij} \circ \phi)(x)$ is $O(|C|)$. Hence, the total complexity of constructing $(P \circ \phi)(x)$ is $O(|C|n^2)=O(n^2)$.

Using Fact 3, the following fact can be stated.

Fact 5: Entries of the matrix $(P \circ \phi)(x)$ are multivariate polynomials whose monomials are subsets of a maximal set of monomials. The cardinality of the maximal set is independent of n.

Having the matrix polynomial $(P \circ \phi)(x)$, an automorphism t is required to obtain the public vector-polynomial $\psi$. It is suggested that the composite automorphism $t=t_2 \circ t_1$ where $t_1$ and $t_2$ are tame automorphisms over $F^n$. If $t_1=[t_{11}, \ldots, t_{1n}]^T$, then $$t_{1i}(x) = x_i + \eta_i \prod_{j=1}^{i-1} x_j^{b_{ij}} + \xi_i \quad \forall i \in [n], \quad (24)$$

where $\eta_2, \ldots, \eta_n \in F \setminus \{0\}$, $\xi_1, \ldots, \xi_n \in F \setminus \{0\}$, and $b_{ij} \in N$ for all $i \in \{2, \ldots, n\}$ and $j \in [i-1]$.

Similarly, if $t_2=[t_{21}, \ldots, t_{2n}]^T$, then $$t_{2i}(x) = x_{n-i+1} + \mu_i \prod_{j=2}^{\min(i,K)} x_{n-i+j}^{c_{ij}} \quad \forall i \in [n] \quad (25)$$

where $\mu_2, \ldots, \mu_n \in F \setminus \{0\}$, $c_{ij} \in N$, for $i \in \{2, \ldots, n\}$ and $j \in \{2, \ldots, \min(i,k)\}$, and K is a constant such that $K<n$ (a typical value is K=5).

The coefficients $\eta_i$ and $\xi_i$ in equation (25) are kept secret and their values are obtained from the set K in Algorithm 2

The exponents $b_{ij}$ and $c_{ij}$ are public.

To keep the complexity of the encryption low, the restriction $b_{ij}$ and $c_{ij} \leq B$ is imposed for all i and j, where B is a fixed integer independent of the block length n. The following important fact is noted.

Fact 6: Each entry of t is a multivariate polynomial that has a constant number of monomials independent of n.

The complexities of evaluating t and $t^{-1}$ are given in the following facts.

Fact 7: Complexities of evaluating t and $t^{-1}$ are both $O(n^2)$.

The next step in generating the OWF $\psi$ is multiplying $(P \circ \phi A)(x)$ and $t(x)$ to get the vector polynomial $\hat{\phi}(x)$ as in equation (10). By Facts 5 and 6, the complexity of carrying out this multiplication is $O(n^2)$. The vector polynomial $\hat{\phi}(x)$ consists of n multivariate polynomials whose number of monomials, given by the following fact, influences the complexity of the encryption.

Fact 8: Entries of $\hat{\phi}(x)$ are polynomials whose monomials are subsets of a maximal set of monomials. The cardinality of the maximal set is $O(n)$.

The final step is generating a unitary matrix A and multiplying it by the vector polynomial $\hat{\vartheta}(x)$ defined in equation (11). As explained above, all unitary matrices are generated by multiplying copies of the building block $U_{v,\zeta}$ defined in equation (1). To reduce the complexity, only one building block is used for A with $\zeta=1$ and v taken from K. The algorithm presented below can be used to generate A with complexity $O((n+r)^2)=O(n^2)$. Once one has the unitary matrix A, the final step is performing the multiplication $A\psi$. Entries of the matrix A are constants, but those of $\psi$ are multivariate polynomials that have $O(n)$ terms by Fact 8. Hence, the complexity of carrying out the multiplication $A\psi$ is $O(n(n+r)^2)=O(n^3)$. The number of monomials of the entries of $\psi$ is given in the following fact.

Fact 9: Entries of $\psi$ are polynomials whose monomials are subsets of a maximal set of monomials. The cardinality of the maximal set is $O(n)$.

All the exponents involved in the construction of $\psi$ are fixed integers except the exponents $a_{ij}$ that are proportional to n. Hence, the following fact can be stated about the total degree of $\psi$.

Fact 10: The total degree of the public polynomials in $\psi$ is proportional to n. The complexities computed in this subsection are summarized in Table I.

TABLE I

| Complexity | | Complexity | | Complexity | | Complexity | |
|---|---|---|---|---|---|---|---|
| P | $O(n^2)$ | P ○ φ | $O(n^2)$ | φ̂ | $O(n^2)$ | Aφ̂ | $O(n^3)$ |
| φ | $O(1)$ | t | $O(n)$ | A | $O(n^2)$ | | $O(n^3)$ |

A toy example of the paraunitary asymmetric cryptosystem is presented below. It is noted that this is not a practical example of the paraunitary asymmetric cryptosystem, and the resulting public-key system is insecure in practice due to small choices for parameters. The purpose of this example is to show how the system is designed and illustrate the structure of public polynomials.

In the design, the computer algebra software Singular has been used.

The block size is n=3 and r=1.

The operating finite field is GF(256) with the primitive element $\epsilon$.

Since r=1, the vector polynomial p is a one-dimensional multivariate polynomial. Its coefficients and exponents are choose as follows.

$$\rho(x) = \epsilon x_1 + \epsilon^3 x_1^2 + \epsilon^3 x_2^8 x_3^6 + \epsilon^6 x_2^{16} x_3^{12} \tag{B.1}$$

For the irreducible polynomial $\psi(x)$ in equation (16), $\omega = \epsilon^5$ since $Tr(\epsilon^5) \neq 0$. These choices give the following irreducible multivariate polynomial for the vector polynomial $\phi(x)$ in equation (14).

$$\phi(x) = \epsilon^5 + \epsilon x_1 + \epsilon^3 x_1^2 + \epsilon^3 x_2^8 x_3^6 + \epsilon^6 x_2^{16} x_3^{12}. \tag{B.2}$$

In the example, the PU matrix P consists of only one degree-one building block as in equation (3) with the vector $v = [e \ e^5 \ e^{47}]^T$. For the unitary matrix A, the building block $U_{v,\xi}$ in equation (1) is used with $\zeta = 1$ and $v = [1 \ e \ e^5 \ e^2 \ e^{33}]^T$. The constant vector b is chosen to be $b = [e3 \ e^2 \ 1 \ e^6 \ e^{17}]^T$.

As stated in Fact 9, the entries of the OWF $\psi$ are polynomials whose monomials are subsets of a maximal set of monomials. Hence, one of the public polynomials is given. The rest of them have similar structures.

If $\phi(x) = [\phi_1(x) \ \phi_3(x) \ \phi_3(x) \ \phi_4(x)]^T$, then the polynomial $\phi_1(x)$ is as follows.

$$\varphi_1(x) = \begin{aligned} &\varepsilon^{33} + \varepsilon^{233} x_1 + \varepsilon^{67} x_2 + \varepsilon^{75} x_3 + \varepsilon^{159} x_4 \\ &+ \varepsilon^{149} x_1 x_2 + \varepsilon^{39} x_2^2 + \varepsilon^{87} x_1 x_3 + \varepsilon^{78} x_2^3 + \varepsilon^{209} x_1^2 x_2^2 \\ &+ \varepsilon^{114} x_1^3 + \varepsilon^{150} x_1^2 x_2 + \varepsilon^{208} x_1 x_2^2 + \varepsilon^{88} x_1^2 x_3 \\ &+ \varepsilon^{25} x_2^3 x_3 + \varepsilon^{160} x_1 x_2^3 + \varepsilon^{153} x_1^4 + \varepsilon^{194} x_2^4 + \varepsilon^{209} x_1 x_2^2 x_3 \\ &+ \varepsilon^{161} x_1^3 x_3^2 + \varepsilon^{154} x_2^5 + \varepsilon^{195} x_1^2 x_2^2 x_3 + \varepsilon^{47} x_1^6 + \varepsilon^{216} x_1^7 \\ &+ \varepsilon^{33} x_1^6 x_3 + \varepsilon^{217} x_1^8 + \varepsilon^{202} x_1^7 x_3 + \varepsilon^{203} x_1^8 x_3 \\ &+ \varepsilon^{75} x_1^5 x_2^6 + \varepsilon^{87} x_1^6 x_2^6 + \varepsilon^{88} x_1^7 x_2^6 + \varepsilon^{25} x_1^5 x_2^8 \\ &+ \varepsilon^{194} x_1^6 x_2^8 + \varepsilon^{195} x_2^8 x_3^6 + \varepsilon^{195} x_1^8 x_3^6 + \varepsilon^{193} x_1 x_2^8 x_3^6 \\ &+ \varepsilon^{151} x_2^9 x_3^6 + \varepsilon^{89} x_2^8 x_3^7 + \varepsilon^{210} x_2^{10} x_3^7 + \varepsilon^{162} x_1 x_2^8 x_3^8 \\ &+ \varepsilon^{33} x_1^{11} x_2^6 + \varepsilon^{155} x_1^3 x_2^8 x_3^6 + \varepsilon^{196} x_2^{10} x_3^7 + \varepsilon^{202} x_1^{12} x_2^6 \\ &+ \varepsilon^{203} x_1^{13} x_2^6 + \varepsilon^{218} x_1^5 x_2^8 x_3^6 + \varepsilon^{204} x_1^6 x_2^8 x_3^6 + \varepsilon^{78} x_1^{10} x_2^{12} \\ &+ \varepsilon^{160} x_1^{11} x_2^{12} + \varepsilon^{161} x_1^{11} x_2^{12} + \varepsilon^{89} x_1^5 x_2^{14} x_3^6 \\ &+ \varepsilon^{196} x_1^5 x_2^{16} x_3^6 + \varepsilon^{198} x_2^{16} x_3^{12} + \varepsilon^{163} x_1 x_2^{16} x_3^{12} \\ &+ \varepsilon^{154} x_1^{17} x_2^{12} + \varepsilon^{92} x_2^{16} x_3^{13} + \varepsilon^{213} x_2^{18} x_3^{12} + \varepsilon^{165} x_2^{16} x_3^{14} \\ &+ \varepsilon^{204} x_1^{11} x_2^{14} x_3^6 + \varepsilon^{158} x_1^3 x_2^{16} x_3^{12} + \varepsilon^{199} x_2^{18} x_3^{13} \\ &+ \varepsilon^{221} x_1^6 x_2^{16} x_3^{12} + \varepsilon^{207} x_1^6 x_2^{16} x_3^{13} + \varepsilon^{162} x_1^{11} x_2^{20} x_3^6 \\ &+ \varepsilon^{92} x_1^5 x_2^{22} x_3^{12} + \varepsilon^{199} x_1^5 x_2^{24} x_3^{12} + \varepsilon^{207} x_1^{11} x_2^{22} x_3^{12} \\ &+ \varepsilon^{165} x_1^{10} x_2^{28} x_3^{12}. \end{aligned}$$

B. The Complexity of Paraunitary Asymmetric Cryptosystem

Below, complexities of the key generation are discussed, along with the encryption, and the decryption in the paraunitary asymmetric cryptosystem. Adding up the complexities listed in Table 1, it is concluded that the total complexity of the public-key generation is $O(n^3)$. The secret key consists of the paraunitary matrix P, the automorphism t, the unitary matrix A, and the constant vector b. By Table 1, the total complexity of generating these matrices and vectors is $O(n^2)$.

To compute the complexity of Algorithm 3 that is the encryption algorithm, it is noted that by Fact 9, the public polynomials $\psi_1, \ldots, \psi_{n+r}$ (entries of $\psi$) share the same set of monomials.

Let this set be $\{x^{\alpha_i} : \alpha_i \in \mathbb{Z}_{\geq 0}^n, i \in [M]\}$ where $M \in \mathbb{N}$ is the cardinality of this set. Then, $$\phi_i(x) = \sum_{j=1}^{M} \psi_{ij}(x)$$

where $\psi_{ij} \in F$.

Thus, $\psi(x)$ has the matrix formulation $\psi(x) = \Psi X$ where $\Psi = [\psi_{ij}]$ is an $(n+r) \times M$ matrix and $X = [x^{\alpha_1}, \ldots, x^{\alpha_M}]^T$ is a vector of length M. The complexity of computing $\Psi X$ is $M(n+r)$. Since $M = O(n)$ by Fact 9, the total complexity is $O(n^2)$. The complexity of evaluating the vector X at the plaintext block is $O(n^3)$ by Fact 10. Hence, the total complexity of the encryption is $O(n^3)$.

For the decryption, Algorithm 4 is employed. The complexity of computing v in this algorithm is $O((n+r)^2) = O(n^2)$. Since by Fact 3 every entry of the paraunitary matrix P has constant number of monomials, the complexity of computing $P^T(z_1^{-1}, \ldots, z_r^{-1})$ in Algorithm 4 is $O(n^2)$. Using Fact 7, the complexity of computing the plaintext vector x in this algorithm is $O(n^2)$. Hence, the total complexity of the decryption is $O(n^2)$.

In summary, the complexity of paraunitary asymmetric cryptosystem in Table II. The complexity of HFE public-key scheme is also provided for comparison. The table shows that the computational complexity of the public-key generation and the decryption in the paraunitary asymmetric cryptosystem is lower than those in the HFE. It is worth mentioning that the complexities of encryption and decryption in RSA are both $O(m^3 n^3)$ for a block length of size mn bits. In Table II, m is the number of bits per field element.

TABLE II

| | Public-key generation | Secret-key generation | Encryption | Decryption |
|---|---|---|---|---|
| PAC | $O(m^2 n^3)$ | $O(m^2 n^2)$ | $O(m^2 n^3)$ | $O(m^2 n^2)$ |
| HFE | $O(m^2 n^4)$ | $O(m^2 n^2)$ | $O(m^2 n^3)$ | $O(m^2 n^2 (m + \log n))$ |

Cryptanalysis of the Instance of the Paraunitary Asymmetric Cryptosystem

The entries of the vector polynomial $\psi$ are the public information in paraunitary asymmetric cryptosystem. In order to attack this scheme, one approach is solving the system of polynomial equations $y_i = \psi_i(x)$, $i \in [n+r]$, for x where $y = (y_1, \ldots, y_{n+r})$ is the ciphertext. The other approach is finding the secret key from the public polynomials. Below, the vulnerability of paraunitary asymmetric cryptosystem to algebraic attacks initially developed for the HFE family is investigated. Some of these attacks are quite general and applicable on other schemes. The vulnerability of the paraunitary asymmetric cryptosystem for some bad choices of parameters is also investigated. These attacks follow one of the approaches mentioned above. Results show that the practical instance of the paraunitary asymmetric cryptosystem, discussed above, is resistant to all these attacks. Note that key exhaustive-search has the complexity $|F|^n \geq 2^{128}$ that is infeasible. Attacks studied include the Gröbner basis, univariate polynomial representation, relinearization, XL and FXL algorithms, and an attack for small r.

Since the public polynomials of HFE are homogenous, all attacks developed for HFE are specialized for homogenous polynomials. The public polynomials in paraunitary asymmetric cryptosystem are not homogenous. However, they can be converted into the homogenous form using a technique employed in algebraic geometry for going from the affine space to the projective space. Let $\theta_i$ be the total degree of the public polynomial $\psi_i$ in the PAC, where $i \in [n+r]$. Suppose $\theta = \max\{\theta_1, \ldots, \theta_{n+r}\}$.

To convert the system of public polynomials into a system of homogenous polynomial equations, replace $x_i$ by $X_i/X_0$ for all $i \in [n]$ and multiply through each equation by $X_0^\theta$.

The result is the following system of homogenous equations of degree $\theta$ that consists of n+r equations in n+1 variables $X_0, \ldots, X_n$ $$X_0^\theta y_i = X_0^\theta \psi_i\left(\frac{X_1}{X_0}, \ldots, \frac{X_n}{X_0}\right), \; i \in [n+r]. \quad (26)$$

From Fact 10, it is noted that the total degree of the homogenous polynomials in this system is proportional to n, i.e., $\theta = O(n)$.

A. Gröbner Basis

Gröbner basis is the classical method for solving systems of polynomial equations. This technique can theoretically solve all systems of this kind. However, its complexity is exponential in the number of variables although there is no closed form formula for it. The complexity of computing a Gröbner basis for the public polynomials of the HFE is infeasible using the Buchberger's algorithm that is the classical algorithm for computing the Gröbner basis. However, it is completely feasible using the algorithm $F_5$ discussed by J. C. Faugere et al., in "Algebraic cryptalanalysis of hidden field equation (HFE) cryptosystems using Gröbner bases," in *Adv. Cryptol.—CRYPTOL '03*, vol. 2729, Lecture Notes in computer Science, pp. 44-60. The complexities of solving the public polynomials of several instances of the HFE using the algorithm $F_5$ are provided Faugere. The special form of the public polynomials in the HFE scheme makes it vulnerable to different attacks. In particular, it implies a relatively small upper bound on the degrees of the polynomials that occur during the Gröbner basis computation. Moreover, as expressed by Faugere, "A crucial point in the cryptanalysis of HFE is the ability to distinguish a random algebraic system from an algebraic system coming from HFE." The public polynomials in the PAC are not homogenous. Moreover, they look random since they are derived from the general formula in equation (7) relating an arbitrary system of polynomial equations to PU matrices.

In order to apply the methods of Faugere to the paraunitary asymmetric cryptosystem, the system of homogenous polynomials in equation (26) is employed. However, the total degree of the resulting system is proportional to the number of variables n. It is explained by Faugere that in this case, there does not seem to exist a polynomial time algorithm to compute the Gröbner basis. Hence, solving the public polynomials of the paraunitary asymmetric cryptosystem using the Gröbner basis method is infeasible.

B. Univariate-Polynomial Representation of the Public Polynomials

This attack is based on the observation that any system of n multivariate polynomials in n variables over a field F can be represented as a single sparse univariate polynomial of a special form over an extension field K of degree n over F. This is summarized in the following lemma.

Lemma 2: Let $f_i(x_1, \ldots, x_n), i \in [n]$ be any system of n multivariate polynomials in n variables over F with the cardinality q. Then, there are coefficients $a_0, \ldots a_{q^n-1} \in K$ such that the system of polynomials is equivalent to the univariate polynomial $$F(x) = \sum_{i=0}^{q^n-1} a_i x^i.$$

The drawback of this approach is that the number of terms of the equivalent univariate representation $F \in K[x]$ is exponentially related to the number of variables. However, when the polynomials $f_i$ are homogenous, which is the case in HFE, the polynomial F is sparse. This fact, stated in the following lemma, significantly enhances the attack on the HFE using univariate polynomial representation.

Lemma 3: Let C be any collection of n homogenous multivariate polynomials of degree $\theta$ in n variables over F. Then, the only powers of x that appear in the univariate polynomial representation F over K are sums of exactly $\theta$ (not necessarily distinct) powers of q, i.e., $q^{i_1} + \ldots + q^{i_\theta}$. Hence, the number of nonzero terms and the degree of F are both $O(n^\theta)$.

To apply the above technique to solve the homogenous form of the public polynomials in the PAC in equation (26), recall that the degree of the homogenous polynomials $\theta$ is proportional to n. Hence, the degree and the number of non-zero terms of the univariate polynomial representation F are both $O(n^n)$. The complexity of root finding algorithms, e.g., Berlekamp algorithm, is polynomial in the degree of the polynomial. This results in an exponential time algorithm to find the roots of F. Therefore, this approach is less efficient than the exhaustive search.

C. Relinearization, XL, and FXL Algorithms

These techniques, developed to attack the HFE family, are methods for solving highly overdefined systems of polynomial equations, i.e., systems consisting of $\epsilon n^2$ equations in n variables where $\epsilon > 0$. In this situation, the complexity of these algorithms is approximately $n^{O(1/\sqrt{\epsilon})}$. However, when the number of equations is n+r for some $1 \leq r \leq n$, then these techniques are not efficient. In order to mount an attack on the HFE scheme using these methods, the equivalent univariate polynomial representation of the public polynomials are obtained using Lemma 2. By Lemma 3, it has the form $G(x) = xGx^T$ where $G = [g_{ij}]$ and $x = [x^{q^0}, \ldots, x^{q^{n-1}}]$. It has been shown that the cryptanalyst can use this matrix representation to obtain a system of $O(n^2)$ polynomial equations in $O(n)$ variables. The relinearization, XL, and FXL algorithms are used to solve this system. Since the homogenous form of the public polynomials of the PAC in equation (26) are not quadratic, their univariate polynomial representation is not quadratic. Hence, it does not have a matrix representation as $G(x)$. Therefore, the attack developed by A. Kipnis et al., in "Cryptanalysis of the HFE public key cryptosystem by relinearization," in *Adv. Cryptol.—CRYPTO '99*, 1999, vol. 1666, Lecture Notes in Computer Science, pp. 19-30 is not applicable on the PAC. However, the adversary may directly apply the relinearization, XL, or FXL algorithm, the system of homogenous polynomials in equation (26). In the following, it is shown that this approach is unsuccessful.

The relinearization technique is developed Kipnis for solving overdefined systems of homogenous quadratic polynomial equations. Unfortunately, it has been shown that the relinearization technique is not as efficient as one may expect since many of the newly generated equations are dependent. Hence, an extended relinearization (XL) algorithm was proposed by N. T. Courtois, et al., in "Efficient algorithms for solving overdefined systems of multivariate polynomial equations," Adv. Cryptol.—EUROCRYPT'00, 2000, vol. 1807, Lecture Notes in Computer Science, pp. 392-407. It is claimed to be the best algorithm for highly overdefined systems of multivariate homogenous equations. Using the homogenous polynomials of equation (26), a system of n+r homogenous equations in n+1 variables are provided where $1 \leq r \leq n$. It has been that in this case, the XL has exponential complexity. Therefore, the XL algorithm cannot be directly used to mount an attack on the PAC.

A variant of the XL algorithm, called fixing and XL (FXL), was introduced by Courtois. In this algorithm, some variables are guessed to make the system slightly overdefined. Then, the XL algorithm is applied. The main question is how many variables must be guessed. Although more guesses make the system more unbalanced, they add to the complexity of the algorithm. The optimum number of guesses is provided by Courtois. Using this optimum value, the FXL has the exponential complexity for solving the system of public polynomials in PAC. Hence, the FXL algorithm can not be efficiently applied on the PAC.

D. An Attack for Small r

This attack is applicable on the PAC when r is small, specially r=0.1, and also when $t=[t_1, K, t_n]^T$ in equation (12) is a tame automorphism of the form $$t_i(x) = x_i + g_i(x_1, \ldots, x_{i-1}), \forall i \in [n] \quad (27)$$

where $g_i \in F[x_1, K, x_{i-1}]$. The attack for r=1 is now briefly described. In this case, $\phi$ is a multivariate polynomial in x, denoted by $\phi(x)$, i.e., $$\phi(x) = \gamma \left( \alpha x_1 + \beta \prod_{i=2}^{n} x_i^{a_i} \right).$$

The adversary fixes $x_1, \ldots, x_{i-1}$ and computes the value of $\psi$ for all $x_n \in F$. There exists a subset $D \subset F$ and a constant $\phi_0 \in F$ such that for all $x_n \in D$, $\phi(x) = \phi_0$. The PU matrix becomes the constant matrix $P(\phi_0)$ over D. Because of the special structure of the automorphism t in equation (27), the values of the polynomials $t_1, \ldots, t_{n-1}$ do not change over D since they depend only on $x_1, \ldots, x_{n-1}$. The only polynomial that varies over D is $t_n$. This implies that $E = \{\psi(x) : x_n \in D\}$ is a one-dimensional subspace of $F^{n+1}$. Examination of E gives the value of the last column of P up to scaling.

In the next step, the adversary fixes $x_1, \ldots, x_{n-2}$ and computes the value of v for all $(x_{n-2}, x_n) \in F^2$. Using a similar approach, the adversary can obtain some information about the next-to-the-last column of the PU matrix P. Repeating this process, the adversary is able to obtain useful information about the PU matrix.

This attack works for two reasons:

1. The variable $x_n$ appears only in the last entry of the automorphism t. Hence, by fixing $x_1, \ldots, x_{n-1}$, the polynomials $t_1, \ldots, t_{n-1}$ become constant. The practical instance of the PAC, introduced above, does not have this problem. The automorphism t employed in the practical instance is the composition of two tame automorphisms $t_1$ and $t_2$ given in equations (24) and (25). By the special structure of these automorphisms, every variable appears in at least K entries of t.

2. In the example given here, $F[\phi(x)]$ has the lowest transcendental degree. To avoid such attacks, the value of r should not be small. In general, in order to find D, the adversary must examine the set $F^r$ that has cardinality $|F|^r = 2^{8r}$. For the typical choice r=10, the size of this space is $2^{80}$. Thus, finding D becomes infeasible for the adversary.

In summary, a framework was introduced to construct public-key cryptosystems using paraunitary (PU) matrices over finite fields. This framework evolves from relating general systems of multivariate polynomial equations to the paraunitary matrices. Using the general formula expressing this relationship, a practical trapdoor one-way function (OWF) has been designed. The difficulty of inverting the OWF is based on the NP-hard problem of solving systems of multivariate polynomial equations. A new public-key cryptosystem paraunitary antisymmetric cryptosystem has been disclosed based on the trapdoor OWF. To encrypt a message using PAC, public multivariate polynomials are evaluated at the message. Hence, comparing to other public-key cryptosystems such as RSA and ElGamal the encryption algorithm is efficient. A practically efficient instance of the paraunitary antisymmetric cryptosystem was described by making simplifications to the general description. The PU matrix used in the instance of paraunitary antisymmetric cryptosystem can be generated using fully-parameterized elementary building blocks. There are algorithms to efficiently generate these building blocks. Therefore, the key setup is fast and efficient in PAC which is another distinguishing feature of the scheme. By developing efficient realization of the instance of the paraunitary antisymmetric cryptosystem, it has been shown that the complexities of the public-key generation and the decryption in the paraunitary antisymmetric cryptosystem are lower than those in the HFE.

Multivariate Signatures

Disclosed below are details regarding techniques for generating multivariate signatures using algebraic techniques. More specifically, this involves an algebraic framework for designing trapdoor one-way functions with applications in multivariate signature schemes. The framework involves PU matrices (discussed above), which are a special subset of invertible polynomial-matrices. The algebraic framework is used to implement a paraunitary digital—signature scheme (PDSS).

In the disclosed approach, t is designed to be an arbitrary bijection over $F^n$. The difficulty is that for any $\in F^n$, solving the equation y=P(x)t(x) for x requires knowledge of the value of $\tilde{P}(x)$ at x that in turn requires the knowledge of x. To overcome this paradigm, an r-variate paraunitary matrix $P \in PU_n(F[z_1, \ldots, z_r])$ is used for some $r \in N$ with the restriction $1 \leq r \leq n$. This paraunitary matrix is composed with a polynomial vector $\phi(x,x') \in (F[x,x'])^r$ where $x' = (x'_1, \ldots, x'_r)$. Let $\phi_{x'}(x)$ and $\phi_x(x')$ denote the polynomial vector $\phi(x,x')$ when x' and x are fixed, respectively. The only restriction imposed on $\phi$ is that for any $x \in F^n$, the polynomial mapping $\ddot{o}_x : F^r \to F^r$ must be a bijection. In a single formula, the following mapping is used:

$$\psi : F^{n+r} \to F^n$$

$$(x, x') \to (P \circ \phi)(x, x') t(x)$$

To prove that that this mapping satisfies all the properties required for a signature scheme, let $y \in F^n$ be an arbitrary vector. Randomly choose a vector $z=(z_1, \ldots, z_r) \in F^r$ such that $z_i \neq 0$ for all $i \in [r]$, and set $\ddot{o}(x, x')=z$. Since t is an efficiently invertible bijection, the value of x is uniquely obtained as $x=t^{-1}(\tilde{P}(z)y)$. In addition, uniquely obtain the value of x' from the equation $\phi_x(x')=z$. Since this procedure is valid for all $y \in F^n$, the mapping $\psi$ is surjective. Moreover, by the presented procedure, the value of x depends on the random choice for z. Hence, $\psi$ is a many-to-one function that can be efficiently inverted.

The signature-generation algorithm of the PDSS is presented in Algorithm 5.

---
Algorithm 5: Sign
---
INPUT: Message $y \in F^n$ $y \in F^n$
OUTPUT: Signature $(x, x') \in F^{n+r}$
1. Randomly choose $z = (z^1, \ldots, Z_r) \in F^r$ such that $z_i \neq 0$ for all $i \in [r]$,
2. $x = t^{-1}(\tilde{P}(z)y)$, $x' \leftarrow \phi_x^{-1}(z)$
3. Return $(x, x')$ For verification, the signature $(x, x')$ of the message y is accepted if $y = \emptyset(x, x')$. Since the signature generation depends on the random choice for z, the PDSS is a non-deterministic scheme. This is a desirable feature that was not possible in the C* scheme and its variants. The verification algorithm of the PDSS consists only of evaluating the public polynomial-vector $\psi$ at the signature. Since the polynomial evaluation can be performed very fast and efficient, the signature verification in the PDSS has the same properties. This feature makes the PDSS very attractive for many applications in which a message is signed only once, but verified many times. It is worth noting that the PDSS operates on any finite field $F_{2^m}$ with $m \geq 2$.

The key-generation algorithm of the PDSS is presented in Algorithm 6.

---
Algorithm 2: Key generation
---
INPUT: Master key $k \in F^n$
PUBLIC OUTPUT: Polynomial vector $\emptyset \in (F[x, x'])^n$
SECRET OUTPUT: An r-variate paraunitary matrix $P \in PU_n(F[z])$,
a vector polynomial in $\phi \in (F[x, x'])^r$,
an automorphism $t \in Aut(F[x])$.

1. Generate an r-variate paraunitary matrix $P \in PU_n(F[z])$ by multiplying elementary building blocks whose parameters are taken from the set K.
2. Using the vectors in K as coefficients, construct a vector polynomial $\phi \in (F[x,x'])^r$ with the following properties: (1) it must be invertible when $x \in F^n$ is fixed, and (2) it must be semi-invertible when $x' \in F^r$ is fixed.
3. Construct an automorphism $t \in Aut(F[x])$ using the vectors in K as coefficients.
4. Construct the vector polynomial $(P \circ \phi)(x,x')t(x)$.

The complexity of the PDSS is illustrated in Table III.

TABLE III

| | Public-key Generation | Secret-key generation | Signature generation | Verification |
|---|---|---|---|---|
| PDSS | $O(m^2n^3)$ | $O(m^2n^2)$ | $O(m^2n^3)$ | $O(m^2n^3)$ |
| HFE | $O(m^2n^4)$ | $O(m^2n^2)$ | $O(m^2n^2)$ | $O(m^2n^2)$ |

Thus, cryptographic systems and methods that are based on paraunitary matrices have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. A computer program product embodied in a non-transitory computer readable medium, the computer program product adapted to effectuate a public-key cryptographic method, the method comprising:
   defining a paraunitary matrix over a field having characteristic two;
   generating a plaintext vector x; and
   masking the plaintext vector x by evaluating a bijective vector at x and multiplying the result by the paraunitary matrix evaluated at x.

2. The computer program product recited in claim 1, wherein the paraunitary matrix is derived by:
   multiplying a predetermined number of building blocks whose parameters are obtained from the plaintext vector and its bit permutations.

3. A method comprising:
   creating a paraunitary matrix, $P(x)$, in n variables of the form:

$$P(x) = \begin{bmatrix} p_{11}(x) & \cdots & p_{1n}(x) \\ \vdots & \ddots & \vdots \\ p_{n1}(x) & \cdots & p_{nn}(x) \end{bmatrix}$$

creating a polynomial vector $t(x)$ whose entries are polynomials and which is a bijection;
creating a polynomial vector $\phi_A(x)$ by multiplying the paraunitary matrix $P(x)$ by the polynomial vector $t(x)$;
making the polynomial vector $\phi_A(x)$ public while keeping the paraunitary matrix $P(x)$ secret;
encrypting, by a computer processing device, plaintext information using the polynomial vector $\phi_A(x)$;
transmitting the encrypted plaintext information to a site having the paraunitary matrix $P(x)$; and
decrypting the encrypted plaintext information using the paraunitary matrix $P(x)$.

* * * * *